(12) United States Patent
Königsson et al.

(10) Patent No.: US 9,266,055 B2
(45) Date of Patent: Feb. 23, 2016

(54) EXHAUST GAS AND GAS SCRUBBER FLUID CLEANING EQUIPMENT AND METHOD

(75) Inventors: Staffan Königsson, Tumba (SE); Lena Sundquist, Stockholm (SE)

(73) Assignee: Alfa Laval Corporate AB, Lund (SE)

( * ) Notice: Subject to any disclaimer, the term of this patent is extended or adjusted under 35 U.S.C. 154(b) by 467 days.

(21) Appl. No.: 13/578,526

(22) PCT Filed: Feb. 24, 2011

(86) PCT No.: PCT/EP2011/052742
§ 371 (c)(1),
(2), (4) Date: Oct. 25, 2012

(87) PCT Pub. No.: WO2011/104302
PCT Pub. Date: Sep. 1, 2011

(65) Prior Publication Data
US 2013/0037493 A1    Feb. 14, 2013

(30) Foreign Application Priority Data

Feb. 25, 2010  (EP) .................................. 10154682
Jul. 2, 2010    (EP) .................................. 10168279

(51) Int. Cl.
B01D 53/14    (2006.01)
B01D 21/26    (2006.01)
C02F 1/38     (2006.01)
C02F 103/18   (2006.01)
(Continued)

(52) U.S. Cl.
CPC .......... *B01D 53/1425* (2013.01); *B01D 21/262* (2013.01); *B01D 2247/04* (2013.01); *B01D 2257/302* (2013.01); *B01D 2257/404* (2013.01); *C02F 1/385* (2013.01); *C02F 2103/18* (2013.01); *F01N 3/037* (2013.01); *F01N 3/04* (2013.01)

(58) Field of Classification Search
None
See application file for complete search history.

(56) References Cited

U.S. PATENT DOCUMENTS 3,630,432 A    12/1971  Murkes
3,831,347 A *  8/1974  Ferretti ........................ 95/195
(Continued)

FOREIGN PATENT DOCUMENTS

CN    1034555 C     7/1994
CN    101428193 A   5/2009
(Continued)

OTHER PUBLICATIONS

Office Action from corresponding Singapore Application No. 201206311-1, dated Jan. 24, 2014.
(Continued)

*Primary Examiner* — Duane Smith
*Assistant Examiner* — Phillip Shao
(74) *Attorney, Agent, or Firm* — MKG, LLC (57) ABSTRACT

Exhaust gas cleaning equipment including a gas scrubber and a scrubber fluid cleaning equipment for cleaning polluted scrubber fluid. The scrubber fluid cleaning equipment includes a centrifugal separator for separating at least a pollutant phase and a cleaned scrubber fluid from said polluted scrubber fluid. The centrifugal separator has a rotor enclosing a separation space with a stack of separating discs, a separator inlet for polluted scrubber fluid extending into said separation space, a first separator outlet for cleaned scrubber fluid extending from said separation space, and a second separator outlet for the pollutant phase extending from said separation space.

15 Claims, 4 Drawing Sheets (51) Int. Cl.
*F01N 3/037* (2006.01)
*F01N 3/04* (2006.01)

(56) References Cited

U.S. PATENT DOCUMENTS

| | | | |
|---|---|---|---|
| 3,924,804 A | | 12/1975 | Niemeyer |
| 3,959,441 A | | 5/1976 | Furuta et al. |
| 4,115,517 A | | 9/1978 | Stark et al. |
| 4,141,961 A | | 2/1979 | Miller |
| 4,218,428 A | | 8/1980 | Etoh et al. |
| 4,286,971 A | | 9/1981 | Burcaw, Jr. et al. |
| 4,614,598 A | | 9/1986 | Zettier et al. |
| 4,770,784 A | * | 9/1988 | Davis et al. ............ 210/638 |
| 4,925,442 A | | 5/1990 | Bodelson |
| 5,039,499 A | * | 8/1991 | Stowe, Jr. ............ 423/243.1 |
| 5,618,432 A | * | 4/1997 | Rewitzer et al. ............ 210/634 |
| 5,657,630 A | | 8/1997 | Kjemtrup et al. |
| 5,792,037 A | | 8/1998 | Bodelson et al. |
| 6,638,342 B2 | * | 10/2003 | Gansley et al. ............ 95/189 |
| 7,056,363 B2 | * | 6/2006 | Carlsson et al. ............ 55/406 |
| 7,540,838 B2 | | 6/2009 | Scott et al. |
| 7,731,772 B2 | * | 6/2010 | Lagerstedt et al. ............ 55/407 |
| 2003/0032540 A1 | | 2/2003 | Stroucken et al. |
| 2003/0233932 A1 | | 12/2003 | Ekeroth |
| 2005/0037333 A1 | | 2/2005 | Pham |
| 2008/0134891 A1 | | 6/2008 | Jarvenpaa |
| 2008/0190844 A1 | * | 8/2008 | Haase ............ 210/622 |
| 2009/0266231 A1 | * | 10/2009 | Franzen et al. ............ 95/68 |
| 2012/0295782 A1 | * | 11/2012 | Pitkamaki et al. ............ 494/41 |

FOREIGN PATENT DOCUMENTS

| | | |
|---|---|---|
| DE | 102009017936 A1 | 10/2010 |
| EP | 0453005 A1 | 10/1991 |
| EP | 0492758 A2 | 7/1992 |
| EP | 0577543 A1 | 1/1994 |
| EP | 701656 B1 | 5/1998 |
| EP | 1857169 A1 | 11/2007 |
| EP | 2364760 A1 | 9/2011 |
| GB | 1039031 A | 8/1966 |
| GB | 2055056 A | 2/1981 |
| JP | 47-32092 | 8/1972 |
| JP | 53-61567 | 6/1978 |
| JP | 54-06897 | 1/1979 |
| JP | 57-19048 A | 2/1982 |
| JP | S63-130127 U | 8/1988 |
| JP | 01-242160 A | 9/1989 |
| JP | H07-39788 A | 2/1995 |
| JP | 10-192647 A | 7/1998 |
| JP | 2001-239184 A | 9/2001 |
| JP | 2002-518159 A | 6/2002 |
| JP | 2003071434 A | 3/2003 |
| JP | 2004-081933 B2 | 3/2004 |
| JP | 2004081933 A | 3/2004 |
| JP | 2004-154694 A | 6/2004 |
| JP | 2005-161234 A | 6/2005 |
| JP | 2006-320870 A | 11/2006 |
| JP | 3868352 B2 | 1/2007 |
| JP | 2007-051555 A | 3/2007 |
| KR | 10-2010-0029756 A | 3/2010 |
| RU | 1790436 | 1/1993 |
| RU | 2233709 C2 | 8/2004 |
| RU | 2317429 C2 | 2/2008 |
| WO | 9429587 A1 | 12/1994 |
| WO | 9944722 A1 | 9/1999 |
| WO | 99-65610 A1 | 12/1999 |
| WO | 02068809 A1 | 9/2002 |
| WO | 2007045721 A1 | 4/2007 |
| WO | 2008058340 A1 | 5/2008 |
| WO | 2008065238 A1 | 6/2008 |
| WO | 2008-140378 A1 | 11/2008 |
| WO | 2009022050 A1 | 2/2009 |

OTHER PUBLICATIONS

Decision of Rejection from corresponding Japanese Patent Application No. 2012-554342, dated Feb. 18, 2014.
International Search Report for PCT/EP2011/052742, dated Jun. 1, 2011.
Decision to Grant from corresponding Russian Patent Application No. 2012-140752 dated May 7, 2014.
Search Report from corresponding Chinese Patent Application No. 201180010913.6, dated Apr. 15, 2014.
Partial English translation of JP3868352, filed on Aug. 23, 2002.
Partial English translation of JP Patent Application Kokai publication No. 1-242160, filed on Mar. 25, 1998.
English translation of First Office Action for Japanese Patent Application No. 2014-125689, dated Jun. 9, 2015.
English translation of First Office Action for Japanese Patent Application No. 2013-517151, dated Jan. 7, 2014.
English translation of Decision on Grant for Russian Patent Application No. 2013104444/05(006621), dated Jun. 30, 2014.
English translation of KIPO's Notice of Preliminary Rejection for Korean Patent Application No. 10-2012-7034261, dated Oct. 28, 2014.
Text of First Office Action for Chinese Patent Application No. 201180330133, dated Sep. 27, 2013.

\* cited by examiner

EXHAUST GAS AND GAS SCRUBBER FLUID CLEANING EQUIPMENT AND METHOD

BACKGROUND OF THE INVENTION

The present invention relates to exhaust gas cleaning equipment comprising scrubber fluid cleaning equipment and a method for cleaning polluted scrubber fluid.

The shipping industry of today strives to reduce harmful emissions, such as emissions originating from the combustion of fuel in the engine, in order to minimize the negative environmental impact and fulfill present and upcoming emission regulations.

One part in this is the reduction in sulphuric oxide ($SO_x$) emissions from ships. Sulphuric oxides are created in the combustion of fuels containing sulphuric residues. The amount of sulphuric oxides in exhaust gas can be reduced by exhaust gas cleaning, e.g. by using scrubbers. The process of cleaning exhaust gas with the aid of the mentioned scrubbers produces polluted scrubber fluid.

Another object is the reductions in nitrogen oxides ($NO_x$) emissions from marine engines. This can be done by implementing Exhaust Gas Recirculation (EGR), where part of the exhaust gas is recirculated to the combustion chamber of the engine. However, the amount of soot and particles in the exhaust gas needs to be decreased. It is therefore desirable to clean the exhaust gas, which can be done by using a scrubber. Also in this process polluted scrubber fluid is produced.

EP 701656 B1 discloses such equipment for recycling and cleaning of exhaust gas in a supercharged internal combustion engine. A scrubber purifies the recycled gas by using scrubber water. The scrubber water is then passed overboard or deposited to a tank for later purification.

The polluted scrubber fluid comprises soot or other organic or inorganic combustion residues. The release of such polluted scrubber fluid into the sea is unacceptable from an environmental point of view and is strictly regulated. On the other hand it is expensive and undesirable to transport larger amounts of waste material to a harbour for disposal.

JP 3868352 B2 discloses equipment for wastewater treatment where polluted seawater from a scrubber is stored in a storage tank and then cleaned using a combination of a centrifugal separator and two oil filters.

One problem is thus to improve the cleaning of the scrubber fluid. One further aspect of improving the cleaning of the scrubber fluid is to minimize the risk of pollutants being carried over from the scrubber fluid back into the exhaust gas where it may cause problems in downstream equipment such as coolers. A further problem is that particles in polluted scrubber fluid tend to adhere on process equipment and piping over time with the risk of a build up of soot scaling resulting in malfunctioning process equipment, sensors, transmitters and the like. Equipment relying on filter technology also has the drawback in the need for surveillance, service and replacement of filter components.

SUMMARY OF THE INVENTION

According to aspects disclosed herein, the present invention provides a solution to the problems mentioned above by further improving environmental aspects of exhaust treatment procedures, improving the efficiency in exhaust treatment procedures, minimizing the need for service and diminishing problems with process equipment handling scrubber fluid.

Thus, the present invention relates to exhaust gas cleaning equipment for a diesel engine, comprising a gas scrubber for cleaning exhaust gas whereby the gas scrubber produces polluted scrubber fluid comprising pollutant particles originating from the exhaust gas. In one embodiment, the scrubber is a wet scrubber wherein the exhaust gas is brought into contact with the scrubber fluid in order to decrease the amount of pollutants in the exhaust gas. Such a wet gas scrubber may be provided with an inlet for exhaust gas, a humidifying device for providing a scrubber fluid to the exhaust gas and a droplet separator for removing polluted scrubber fluid from the exhaust gas. Connected to the gas scrubber is scrubber fluid cleaning equipment for cleaning the polluted scrubber fluid. The gas scrubber and scrubber fluid cleaning equipment may form a scrubber fluid loop, i.e. a circulation system providing recirculation of scrubber fluid through the scrubber and other components within the system. The scrubber fluid cleaning equipment comprises a centrifugal separator for separating at least a pollutant phase comprising pollutant particles and a cleaned scrubber fluid from said polluted scrubber fluid. The centrifugal separator comprises a rotor enclosing a separation space with a stack of separating discs or a set of separating plates. The separating discs or plates may be frustoconical or have any other suitable shape. The centrifugal separator further comprises a separator inlet for polluted scrubber fluid extending into said separation space, a first separator outlet for cleaned scrubber fluid extending from said separation space, and a second separator outlet for the pollutant phase extending from said separation space. The scrubber fluid cleaning equipment further comprises means for conducting polluted scrubber fluid from the exhaust gas scrubber to the separator inlet, and means for conducting cleaned scrubber fluid from the first separator outlet to the exhaust gas scrubber. The means for conducting scrubber fluid to and from the centrifugal separator and gas scrubber are arranged such as to form a scrubber fluid loop for circulating scrubber fluid. The means for conducting polluted and cleaned scrubber fluid may comprise conduits, piping, tubing, tanks, pumps and the like.

The inventors have found that, by using a disc stack centrifugal separator the separation of the pollutant phase comprising pollutant particles from exhaust gas scrubber fluid is surprisingly efficient. The separation in such a separator is gentle enough to maintain particles agglomerated and at the same time efficient by providing high separation forces and short separation distances. The inventors have also found that lighter liquid organic residues in the scrubber fluid, such as oil, tend to adhere to denser solid particles in the fluid in a way that makes it possible, in the disc stack separator, to separate the oil and the particles as a pollutant phase which is denser than the scrubber fluid. Thus the scrubber fluid cleaning equipment does not have the same need for filters or other treatment steps and therefore improves the handling of the equipment by minimizing the need for service and replacement of key components. The inventors have proven that by applying a disc stack centrifugal separator on the scrubber fluid, a large part of the pollutant phase can be removed in concentrated form and without the addition of chemicals. Therefore the volume of waste material can also be kept low.

In one embodiment, the first separator outlet is provided with a paring device, such as a paring disc, one or more paring tubes or the like. Such a paring device can be used for paring off fluid rotating with the rotor, and can act as a pump for fluid from the first separator outlet. In one embodiment, the first separator outlet is also provided with an external pump for pumping scrubber fluid. In one embodiment, the pump is also a centrifugal pump, a positive displacement pump or any other suitable type of pump.

In one embodiment, the second separator outlet for the pollutant phase extends from the separation space to a space outside the rotor. In one embodiment, the centrifugal separator is further provided with means to transporting the pollutant phase from the space outside the rotor to a container or the like. In one embodiment, the second outlet extends from the radially outermost region of the separation space and be in the form of discharge ports or nozzles. Such discharge ports are arranged, for example, to be opened intermittently, during short periods, for discharge of a separated phase with density higher than the cleaned scrubber fluid, i.e. the pollutant phase. As one alternative the discharge ports are arranged to be opened during a period suitable for total discharge so that to substantially empty the bowl of scrubber fluid and pollutant phase. Thus the amount of pollutant phase, i.e. particles, in the discharge may be within the range of from about 5 to about 30% by volume, typically from about 10 to about 15% by volume, depending on discharge frequency. However, as a further alternative the discharge ports are arranged to be opened for partial discharge during a short period so that to partially empty the bowl during discharge, rendering a higher concentration of pollutant phase, i.e. particles, in the discharge. Alternatively nozzles are provided to allow for continuous discharge of a separated phase with density higher than the cleaned scrubber fluid.

In one embodiment, the separator is further provided with a third separator outlet for another fluid phase which is denser or lighter than the scrubber fluid, such as oil.

If the centrifugal separator is provided with discharge ports for intermittent discharge, in one embodiment, the scrubber fluid cleaning equipment further comprises means for determining a process parameter of the centrifugal separator related to the amount of pollutant phase in the radially outer parts of the separation space. Thereby, the separator is provided with means arranged to open the discharge ports of the second separator outlet under a predetermined condition on the process parameter indicating that the amount of pollutant phase in the radially outer parts of the separation space exceeds a predetermined level. As one alternative, the operational parameter is the turbidity of cleaned scrubber fluid in the first separator outlet and said predetermined condition of the operational parameter is that the turbidity exceeds a predetermined level. As another alternative the separator is provided with a third separator outlet extending from a radially outer part of the separation space, and wherein the operational parameter is the pressure at the third separator outlet and the predetermined condition is that the pressure is below a predetermined level. Thereby, the pollutant particles separated from the polluted scrubber fluid are discharged from the separation space of the centrifugal separator when a specific amount of pollutant particles has been collected in the separation space, thus obtaining a balance between a too large amount of pollutant particles being collected in the separation space, decreasing the separation efficiency, and too low amount of pollutant particles in the discharge, yielding an unnecessary large amount of waste to handle onboard a ship. The amount of pollutant phase, i.e. particles, in the discharge by these means ranges from about 14 to about 40% by volume, for example, about 30% by volume for total discharge and from about 50 to about 75% by volume, for example, from about 50 to about 60% by volume for partial discharge.

In one embodiment, the separator inlet is of a hermetic type. A hermetic inlet is sealed from the surroundings of the rotor and is arranged to be filled with scrubber fluid during operation. In a hermetic type of inlet the acceleration of the fluid is initiated at a small radius and gradually increased while the fluid leaves the inlet and enters the separation space. By using an inlet of a hermetic type, shear forces acting on the particle agglomerates in the scrubber fluid can be minimized, thereby improving the separation efficiency of the pollutant phase even further.

In one embodiment, the exhaust gas cleaning equipment is further comprise a buffer tank, wherein the means for conducting cleaned scrubber fluid from the first separator outlet to the exhaust gas scrubber may be arranged for conducting cleaned scrubber fluid from the first separator outlet to the exhaust gas scrubber via the buffer tank. Thereby cleaned scrubber fluid from the first separator outlet is led to the buffer tank and thus the concentration of pollutant phase in the scrubber fluid in the buffer tank is held low. Problems with deposition of material onto sensitive parts of the equipment by fouling or scaling can therefore be minimized. Problems associated with clogging of piping and the formation and transportation of larger clusters of material in the cleaning equipment and scrubber can also be decreased. The means for conducting polluted scrubber fluid, from an exhaust gas scrubber to the separator inlet, may further be arranged for conducting polluted scrubber fluid from the exhaust gas scrubber to the separator inlet via the buffer tank. The scrubber fluid in the buffer tank may be continuously cleaned in the centrifugal separator, or cleaned when the concentration of pollutant in the buffer tank exceeds a certain level. Thereby the concentration of pollutant phase in the buffer tank is minimized or held below a certain low level despite polluted scrubber fluid being provided from the exhaust gas scrubber. As an alternative the means for conducting polluted scrubber fluid, from an exhaust gas scrubber to the separator inlet, is arranged for conducting polluted scrubber fluid directly from the exhaust gas scrubber to the separator inlet.

In one embodiment, the means for conducting cleaned scrubber fluid from the first separator outlet to the exhaust gas scrubber is arranged for conducting cleaned scrubber fluid directly from the first separator outlet to the exhaust gas scrubber. Directly is meant to include conduction via piping, tubing, tanks and the like and with the possible application of pumps, boosters and the like. In one embodiment, the means for conducting polluted scrubber fluid from an exhaust gas scrubber to the separator inlet is arranged for conducting polluted scrubber fluid from the exhaust gas scrubber to the separator inlet via a buffer tank.

By incorporating a disc stack separator the need for filters or other treatment equipment is minimized. The use of the disc stack separator allows cleaned scrubber fluid to be directly fed from the first separator outlet to the scrubber without further need of treatment equipment between the separator and the scrubber. Examples of treatment equipment are different kinds of filters, separators etc.

In one embodiment, the scrubber fluid cleaning equipment further comprises a bypass for scrubber fluid communicating with the separator inlet and the first separator outlet. In one embodiment, the bypass is controlled by a valve. Thereby, a controlled flow of scrubber fluid is allowed to bypass the centrifugal separator when the fluid is hindered to pass through the separator, such as during intermittent discharge of the pollutant phase, during a service operation on the separator or during other conditions where the fluid is hindered to pass through the separator.

In one embodiment, the exhaust gas cleaning equipment further comprises means for adjusting the acidity of the scrubber fluid in order to compensate for acidic components, such as $SO_x$, in the exhaust gas which causes the scrubber fluid pH to decrease. In one embodiment, the means is adapted to keeping the acidity of the scrubber fluid above pH 6, in order to maintain particularly good separation performance.

In one embodiment, the scrubber fluid is water, but can also be other suitable liquids. One advantage of water is its ability to dissolve sulphuric oxides. Scrubber fluid as initially included in the process of cleaning exhaust gas, or as added to the process during operation, may preferably be tap water, fresh water or desalinated seawater. The scrubber fluid is in one aspect water having an amount of chlorides less than, or much less than sea water. In one embodiment, tap water is provided from tanks or produced on board by desalination of seawater. In one embodiment, the scrubber fluid however contains salts included from the scrubber process. Further, during scrubbing of hot/warm exhaust gases by means of a wet scrubber, moisture in the exhaust gas may further condensate into water, adding to the volume of scrubber fluid in the scrubber process. In one embodiment, the term scrubber fluid includes cleaned, polluted scrubber fluid, scrubber fluid initially included in the process or added to the process, or combinations thereof. Cleaned scrubber fluid has a reduced amount of pollutants, but still comprises a low amount of pollutants. The pollutant phase separated from the polluted scrubber fluid still comprises a certain amount of scrubber fluid. In one embodiment, the pollutant phase comprises solid or liquid particles comprising organic or inorganic combustion residues such as sulphuric oxide residues, soot, partly oxidized and unoxidized diesel oil and dissolved salts from oxidized metals. The pollutant phase, for example, is denser, i.e. having a higher density, than the cleaned scrubber fluid. Particles generated in the combustion in the engine are normally very small, below the μm scale and typically within the range of from about 10 to about 30 nm. In a suitable fluid such as water they agglomerate into clusters within the μm scale such as within the range from about 5 to about 100 μm, particularly within the range from about 10 to about 30 μm.

In one embodiment, the exhaust gas cleaning equipment further comprises means for bleeding off part of the scrubber fluid to a bleed-off disc stack centrifugal separator. The means for bleeding off part of the scrubber fluid is, for example, arranged for bleeding off part of the polluted scrubber fluid, whereby the bleed-off separator may be arranged for separating at least a pollutant phase comprising pollutant particles and a cleaned scrubber fluid from said polluted scrubber fluid. As an alternative the means for bleeding off part of the scrubber fluid is arranged for bleeding off part of the cleaned scrubber fluid, whereby the bleed-off separator is arranged for removing any remaining pollutant particles in the cleaned scrubber fluid in order to allow it for overboard discharge. The bleed-off separator comprises a rotor enclosing a separation space with a stack of separating discs, a separator inlet for said part of the polluted scrubber fluid comprising pollutant particles extending into said separation space, a first separator outlet for cleaned scrubber fluid extending from said separation space, and a second separator outlet for the pollutant phase extending from said separation space. In one embodiment, the rotor of the bleed-off separator further encloses a conveyor screw which is arranged to be driven at a rotational speed differing from the rotational speed of the rotor so that to convey the pollutant phase, i.e. a separated phase with density higher than the cleaned scrubber fluid, towards the second separator outlet. In one embodiment, the second separator outlet is provided on a smaller radius than the outer radius of the separation space, and the conveyor screw arranged to convey the pollutant phase radially inwards and towards the second separator outlet. Due to this arrangement, the concentration of particles in the discharge can be very high, typically from about 95 to about 100% by volume, minimizing the amount of waste material being produced, while still maintaining a cleaned scrubber fluid that is able to fulfill regulations and that can be released into the environment with a minimal environmental impact.

The present invention also provides a scrubber fluid cleaning equipment as such, being suitable for use in an exhaust gas cleaning equipment according to the invention. The scrubber fluid cleaning equipment thus comprises means to be connectable to an exhaust gas scrubber, such that polluted scrubber fluid from such an exhaust gas scrubber is conducted to the scrubber fluid cleaning equipment and cleaned scrubber fluid from the scrubber fluid cleaning equipment may be conducted to the exhaust gas scrubber. In one embodiment, the exhaust gas scrubber is used for cleaning exhaust gas from a diesel engine, such as a large engine for a ship. The exhaust gas cleaning equipment and the scrubber fluid cleaning equipment according to the invention are also applicable to similar land based scrubber installations.

In another aspect of the present invention, a method for cleaning polluted scrubber fluid, such as water, is provided, comprising the steps of;

providing polluted scrubber fluid from an exhaust gas scrubber, separating, in a disc stack centrifugal separator, a pollutant phase from the polluted scrubber fluid, thereby providing a cleaned scrubber fluid, and providing cleaned scrubber fluid to the exhaust gas scrubber.

In one embodiment, the method is performed in an exhaust gas cleaning equipment according to the present invention.

In one embodiment, the method further comprises the steps of providing cleaned scrubber fluid from the centrifugal separator to a buffer tank, and providing cleaned scrubber fluid from the buffer tank to the exhaust gas scrubber. Cleaned scrubber fluid is alternatively provided directly from the centrifugal separator to the exhaust gas scrubber.

In one embodiment, the method further comprises a step of discharging the separated pollutant phase from the centrifugal separator.

Further alternative embodiments of the present invention are defined in the claims. Various embodiments of the invention will now be explained in more detail with reference to the drawings. The drawings are for the purpose of illustrating the invention and are not intended to limit its scope.

DETAILED DESCRIPTION OF EMBODIMENTS OF THE INVENTION

Figure 1:
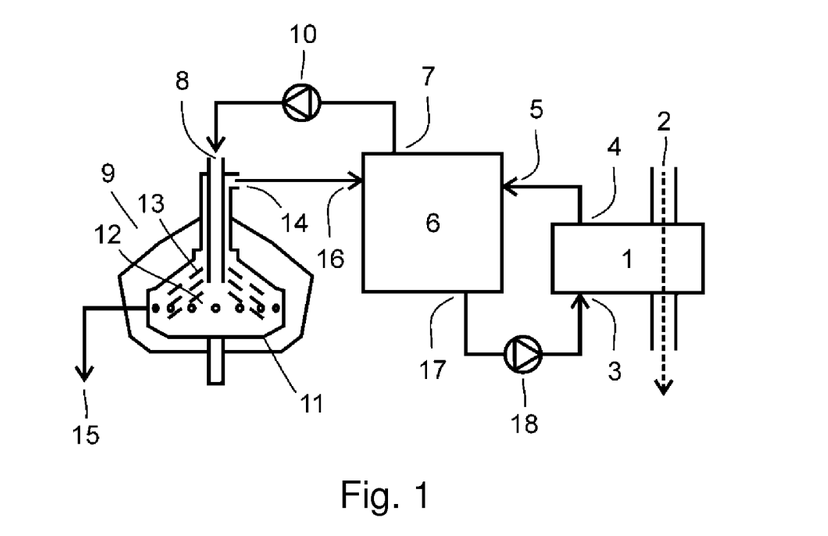
FIG. 1 shows an exhaust gas cleaning equipment comprising a cleaning equipment for gas scrubber fluid according to one embodiment of the invention.

An exhaust gas cleaning equipment comprising a cleaning equipment for gas scrubber fluid is shown in FIG. 1. The exhaust gas scrubber 1 acts on an exhaust conduit 2 of a large diesel engine, such as the main engine of a ship. The scrubber is provided with a scrubber inlet 3 and a scrubber outlet 4 for scrubber fluid. The scrubber outlet 4 is connected to an inlet 5 of a buffer tank 6 for scrubber fluid. Starting from an outlet 7 the buffer tank 6 is provided with a cleaning circuit for scrubber fluid connected to a separator inlet 8 of a centrifugal separator 9 via a separator feed pump 10. The centrifugal separator 9 has a rotor 11 enclosing a separation space 12 which contains a stack of frustoconical separating discs 13 to which separation space the separator inlet 8 extends. The centrifugal separator 9 is further provided with a first separator outlet 14 for cleaned scrubber fluid, and a second outlet 15 extending from the separation space through the rotor in the form of discharge ports or nozzles for discharge of a separated phase with density higher than the cleaned scrubber fluid. The first separator outlet 14 is connected to an inlet 16 on the buffer tank 6, closing the cleaning circuit. The buffer tank is provided with another outlet 17 for providing scrubber fluid to the exhaust gas scrubber, wherein the outlet 17 is connected to the inlet 3 of the scrubber 1 via a scrubber feed pump 18.

During operation, scrubber fluid is provided from the buffer tank 6 to the scrubber inlet 3 via the scrubber feed pump 18. Scrubber fluid is atomised in the scrubber and supplied to a flow of exhaust gas in or from the exhaust conduit 2. In the scrubber, the scrubber fluid is used in cleaning of organic and inorganic combustion residues from the exhaust gas. The resulting mixture of scrubber fluid and exhaust gas combustion residues is separated from the gas stream in the form of droplets and is led back to the buffer tank 6 from the scrubber outlet 4 and the inlet 5 for scrubber fluid of the scrubber fluid cleaning equipment. Exhaust gas combustion residues contained in the scrubber fluid in the form of small particles are agglomerated into larger particles in the fluid, forming a pollutant phase comprising pollutant particles. Scrubber fluid in the buffer tank 6 is, continuously or when needed, sent via the outlet 7 into the cleaning loop by means of the separator feed pump 10 to the separator inlet 8 of the centrifugal separator 9. The scrubber fluid containing the pollutant phase is introduced into the separation space 12 contained in the rotor 11 of the centrifugal separator 9 rotating at a high speed and further into the disc stack 13. The pollutant phase comprising pollutant particles has a mean density that is higher than the scrubber fluid. Under the influence of centrifugal forces and facilitated by the inclined surfaces of the separating discs, the pollutant phase comprising pollutant particles is separated from the scrubber fluid and collected at a radially outer region of the separation space from which it is discharged via the second separator outlet 15. The second separator outlet 15 is in the form of discharge ports or nozzles and the particles are intermittently discharged from the centrifugal separator by opening the discharge ports at the periphery of the rotor 11 for a short period of time or continuously discharged via open nozzles at the periphery of the rotor. The discharging can be performed while scrubber fluid is still fed into the centrifugal separator or temporarily shut off. The discharged pollutant phase may be collected on the ship for later disposal and it is thus important to minimize the volume of the discharge. In order to obtain a discharged pollutant phase having a high concentration of pollutant particles, while still maintaining the separating efficiency, the separator may be provided with means for determining when discharge is needed. This may be reached by monitoring the turbidity in the first separator outlet, whereby the discharge ports are opened when the turbidity in the cleaned scrubber fluid is increased above a threshold indicating filling of the radially outer parts of the separation space with pollutant phase. As an alternative a third separator outlet is arranged to extend from a radially outer part of the separation space, whereby scrubber fluid is recirculated from the third separator outlet to the separator inlet. The means for determining when discharge is needed may in this case comprise a pressure monitor connected to the third separator outlet, whereby a decrease in pressure indicate that the level of pollutant phase has reached the third separator outlet and that discharge is needed. The cleaned scrubber fluid is discharged from the first separator outlet 14 and sent back to the buffer tank from which it is transported to the exhaust gas scrubber.

Figure 2:
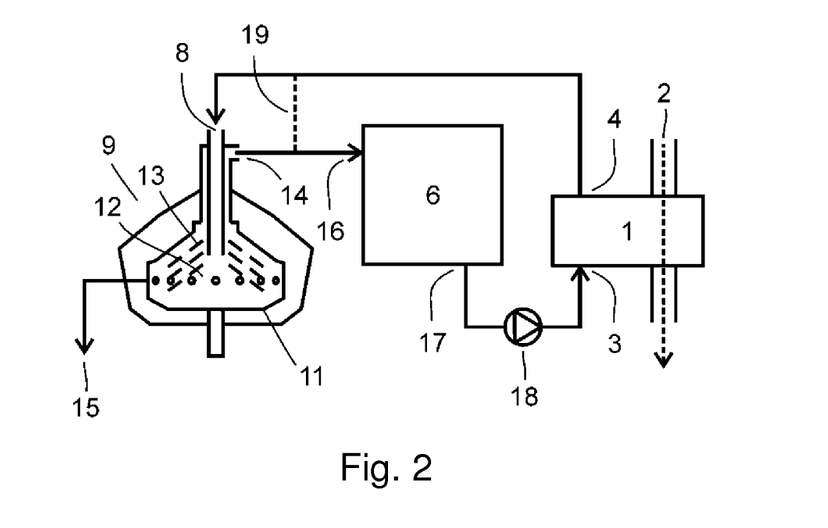
FIG. 2 shows an exhaust gas cleaning equipment comprising a cleaning equipment for gas scrubber fluid according to another embodiment of the invention.

The exhaust gas cleaning equipment shown in FIG. 2 comprises cleaning equipment for gas scrubber fluid connected to an exhaust gas scrubber 1 which is acting on an exhaust conduit 2 from a large diesel engine, such as the main engine of a ship. The scrubber is provided with a scrubber inlet 3 and a scrubber outlet 4 for scrubber fluid. The scrubber outlet 4 is connected to a separator inlet 8 of a centrifugal separator 9. The centrifugal separator 9 has a rotor 11 enclosing a separation space 12 which contains a stack of frustoconical separating discs 13 to which space the separator inlet 8 extends. The centrifugal separator 9 is further provided with a first separator outlet 14 for cleaned scrubber fluid, and a second outlet 15 extending from the separation space through the rotor in the form of discharge ports or nozzles for discharge of a separated phase with density higher than the cleaned scrubber fluid. A bypass conduit 19 controlled by a valve connects the separator inlet 8 with the first separator outlet 14, thereby allowing scrubber fluid to bypass the separator during intermittent discharge, during a service operation on the separator or during other conditions where the fluid is hindered to pass through the separator. The first separator outlet 14 is connected to the buffer tank 6. The buffer tank is provided with another outlet 17 for leading scrubber fluid to the exhaust gas scrubber, wherein the outlet 17 is connected to the inlet 3 for scrubber fluid of the scrubber 1 via a scrubber feed pump 18.

During operation, scrubber fluid is continuously provided from the buffer tank 6 to the scrubber inlet 3 via the scrubber feed pump 18. The function of the scrubber 1 is as described above. The mixture of scrubber fluid and exhaust gas combustion residues is led to the separator inlet 8 of the centrifugal separator and the flow of fluid from the scrubber to the centrifugal separator is driven by an overpressure in the scrubber. The scrubber fluid containing the pollutant phase comprising pollutant particles is introduced into the separation space 12 in the rotor of the centrifugal separator 9, where the pollutant phase is separated from the scrubber fluid, in accordance with the description of FIG. 1. The pollutant phase is discharged via the second separator outlet 15. Clean scrubber fluid is led from the first separator outlet 14 to the buffer tank 6. During intermittent discharge, during a service operation on the separator or during other conditions where the fluid is hindered to pass through the separator, the bypass 19 is opened and scrubber fluid is fed past the centrifugal separator. The cleaned scrubber fluid is yet again led from the buffer tank 6 to the scrubber inlet 3 via the scrubber feed pump 18.

Figure 3:
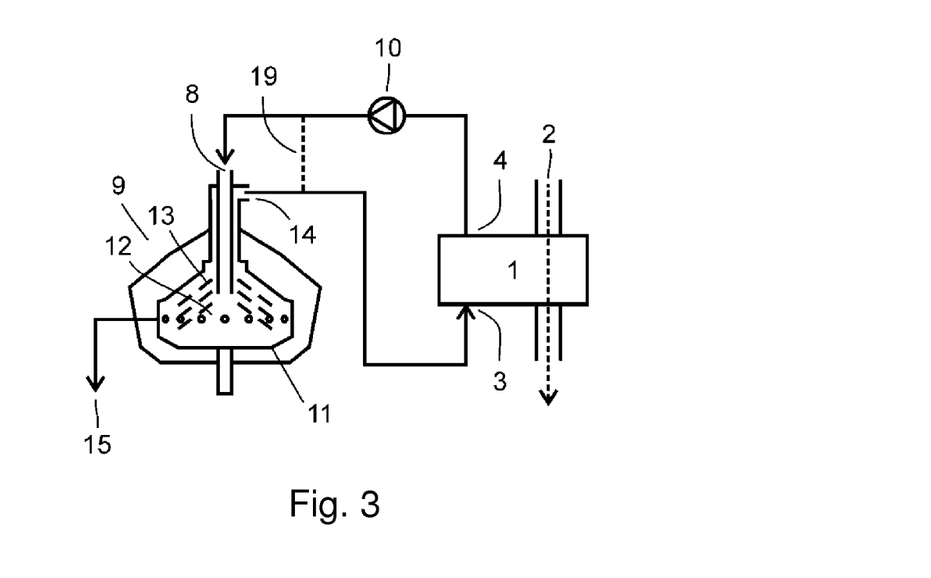
FIG. 3 shows an exhaust gas cleaning equipment comprising a cleaning equipment for gas scrubber fluid according to yet another embodiment of the invention.

Another example of an exhaust gas cleaning equipment comprising a cleaning equipment for gas scrubber fluid according to the invention is shown in FIG. 3. The gas scrubber fluid cleaning equipment is connected to an exhaust gas scrubber 1 which is acting on an exhaust conduit 2 as previously described. The scrubber is provided with a scrubber inlet 3 and a scrubber outlet 4 for scrubber fluid. The scrubber outlet 4 is connected to a separator inlet 8 of a centrifugal separator 9, via an optional separator feed pump 10. The centrifugal separator 9 has a rotor 11 enclosing a separation space 12 which contains a stack of frustoconical separating discs 13 to which space the separator inlet 8 extends. The centrifugal separator 9 is further provided with a first separator outlet 14 for cleaned scrubber fluid extending from an radially inner region of the separation space, and a second outlet 15 extending from an radially outer region of the separation space in the form of discharge ports or nozzles for discharge of a separated phase with density higher than the cleaned scrubber fluid. A bypass conduit 19 controlled by a valve connects the separator inlet 8 with the first separator outlet 14, thereby allowing scrubber fluid to bypass the separator during intermittent discharge, during a service operation on the separator or during other conditions where the fluid is hindered to pass through the separator. The first separator outlet 14 directly leads to the inlet 3 for scrubber fluid of the scrubber 1, without any further filtration or other treatment equipments. However if a higher pressure is needed than what is delivered by the centrifugal separators internal pump, a booster pump can be installed on the first separator outlet 14.

During operation, scrubber fluid is continuously circulated in the circuit and provided to the scrubber inlet 3. The function of the scrubber 1 is as described above. The mixture of scrubber fluid and exhaust gas combustion residues is directed to the separator inlet 8 of the centrifugal separator 9 and the flow of fluid from the scrubber to the centrifugal separator is driven by the feed pump 10. Optionally the flow of fluid from the scrubber to the centrifugal separator is driven by an overpressure in the scrubber. The scrubber fluid containing the pollutant phase is introduced into the separation space 12 where the pollutant phase is separated from the scrubber fluid, in accordance with the description of FIG. 1. The pollutant phase is discharged via the second separator outlet 15. During intermittent discharge, during a service operation on the separator or during other conditions where the fluid is hindered to pass through the separator, the bypass 19 is opened and scrubber fluid is fed past the centrifugal separator. Clean scrubber fluid is led from the first separator outlet 14 directly to the inlet 3 for scrubber fluid of the scrubber 1.

Figure 4:
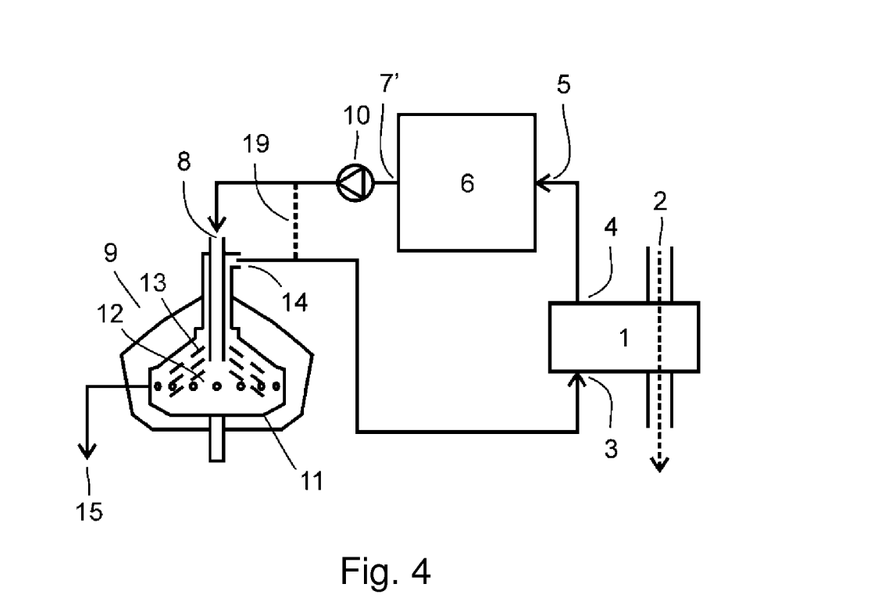
FIG. 4 shows an exhaust gas cleaning equipment comprising a cleaning equipment for gas scrubber fluid according to a further embodiment of the invention.

Another example of an exhaust gas cleaning equipment comprising a cleaning equipment for gas scrubber fluid according to the invention is shown in FIG. 4. The gas scrubber fluid cleaning equipment is connected to an exhaust gas scrubber 1 which is acting on an exhaust conduit 2 as described above. The scrubber is provided with a scrubber inlet 3 and a scrubber outlet 4 for scrubber fluid. The scrubber outlet 4 is connected to an inlet 5 of a buffer tank 6 for scrubber fluid. The buffer tank 6 is provided with an outlet 7' connected to the separator inlet 8 of the centrifugal separator 9, via a separator feed pump 10. The centrifugal separator 9 has a rotor 11 enclosing a separation space 12 which contains a stack of frustoconical separating discs 13 to which separation space the separator inlet 8 extends. The centrifugal separator 9 is further provided with a first separator outlet 14 for cleaned scrubber fluid extending from an radially inner region of the separation space, and a second outlet 15 extending from an radially outer region of the separation space in the form of discharge ports or nozzles for discharge of a separated phase with density higher than the cleaned scrubber fluid. A bypass conduit 19 controlled by a valve connects the separator inlet 8 with the first separator outlet 14, thereby allowing scrubber fluid to bypass the separator during discharge, service or other conditions where the fluid is hindered to pass through the separator. The first separator outlet 14 directly leads to the inlet 3 for scrubber fluid of the scrubber 1, without any further filtration or other treatment equipments.

During operation, scrubber fluid is continuously circulated in the circuit and provided to the scrubber inlet 3. The function of the scrubber 1 is as described above. The mixture of scrubber fluid and exhaust gas combustion residues is directed to the buffer tank 6 and further to the separator inlet 8 of the centrifugal separator 9 via the outlet 7' of the buffer tank by means of the separator feed pump 10. The scrubber fluid containing the pollutant phase is introduced into the separation space 12 where the pollutant phase is separated from the scrubber fluid, in accordance with the description of FIG. 1. The pollutant phase is discharged via the second separator outlet 15. During discharge, service or other conditions where the fluid is hindered to pass through the separator, the bypass 19 is opened and scrubber fluid is fed past the centrifugal separator. Clean scrubber fluid is led from the first separator outlet 14 directly to the inlet 3 for scrubber fluid of the scrubber 1.

Figure 5:
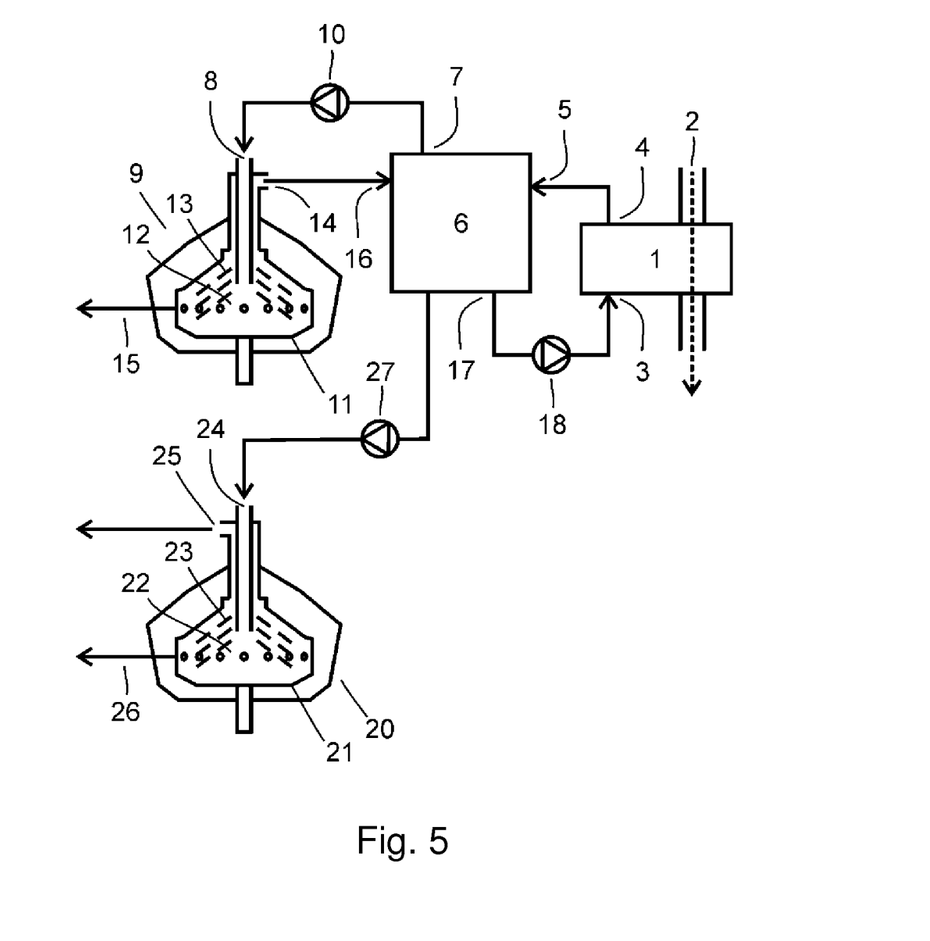
FIG. 5 shows an exhaust gas cleaning equipment comprising a cleaning equipment for gas scrubber fluid according to yet a further embodiment of the invention.

FIG. 5 shows another example of an exhaust gas cleaning equipment comprising a cleaning equipment for gas scrubber fluid according to the invention, similar to what is previously described in FIG. 1. The scrubber 1, the centrifugal separator 9, the buffer tank and any further intermediate components form a scrubber fluid loop for circulation of scrubber fluid. The cleaning equipment for gas scrubber fluid includes means for bleeding off part of the scrubber fluid from the scrubber fluid loop, connected to a further bleed-off centrifugal separator 20 via a bleed off separator feed pump 27. The bleed-off centrifugal separator may in a similar way be connected to a cleaning equipment according to any of the FIGS. 2-4. In the example shown said means are connected to the buffer tank 6 but they may as an alternative be connected to the first separator outlet 14 or any other part of the scrubber fluid loop whereby the amount of pollutant particles in the scrubber fluid is already low, thus allowing an increased volume flow through the bleed-off separator. The feed pump may be replaced by other means for providing fluid flow to the separator inlet, such as by utilizing gravity or by means of overpressure in the buffer tank 6 or scrubber 1. The scrubber fluid loop may further be provided with means for the addition of clean scrubber fluid, such as tap water, fresh water or desalinated seawater to the process during operation (not shown). The bleed-off centrifugal separator 20 has a rotor 21 enclosing a separation space 22 which contains a stack of frustoconical separating discs 23 to which separation space the separator inlet 24 extends. The centrifugal separator 20 is further provided with a first separator outlet 25 for cleaned scrubber fluid, and a second outlet 26 in the form of discharge ports extending from the separation space for discharge of a separated phase with density higher than the cleaned scrubber fluid. The first separator outlet 25 for cleaned scrubber fluid may lead to the outside of the ship for discharge, or to a tank for temporary storage. The second separator outlet 26 may be connected to a storage tank for polluted phase.

During operation, the cleaning of scrubber fluid in the scrubber fluid loop is performed as described in relation to previous examples. From the scrubber fluid loop, part of the polluted scrubber fluid is bled off from the scrubber fluid loop, and transported to the inlet 24 of the bleed-off separator 20. The scrubber fluid containing the pollutant phase is introduced into the separation space 22 contained in the rotor 21 rotating at a high speed and further into the disc stack 23. The pollutant phase has a mean density that is higher than the scrubber fluid. Under the influence of centrifugal forces and facilitated by the inclined surfaces of the separating discs, the pollutant phase is separated from the scrubber fluid and collected at a radially outer region of the separation space 22 from which it is discharged via the second outlet 26 in the form of discharge ports. The pollutant phase is intermittently discharged from the centrifugal separator by opening the discharge ports for a short period of time. The discharged pollutant phase may be collected on the ship for later disposal. The cleaned scrubber fluid is lead from the first separator outlet 25 to the outside of the ship for discharge, or to a tank for temporary storage.

Figure 6:
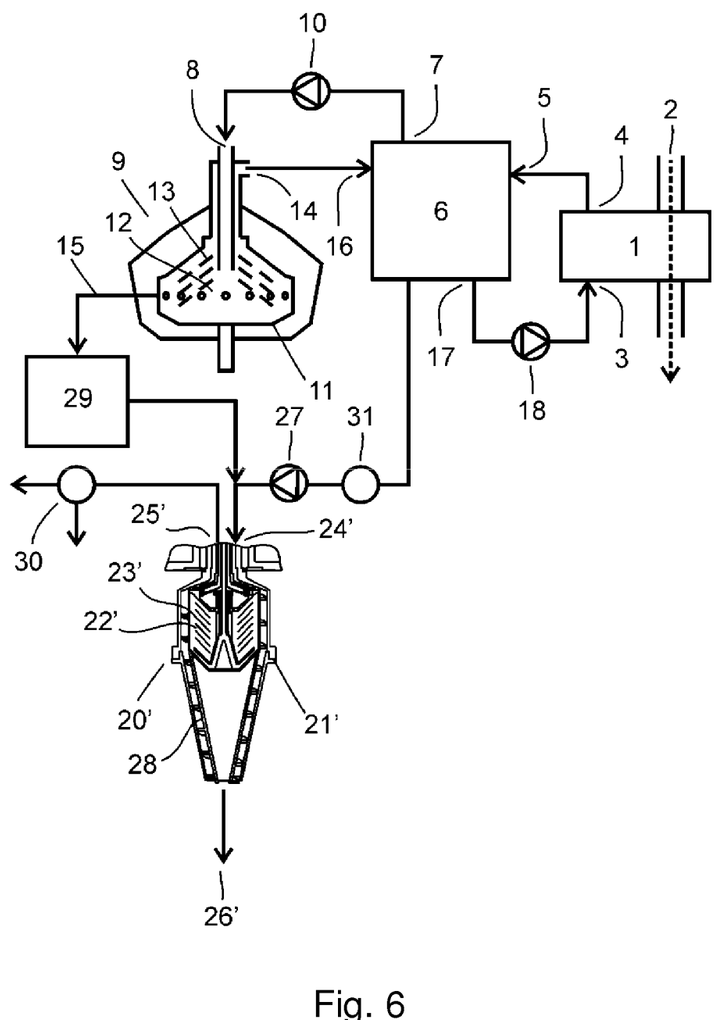
FIG. 6 shows an exhaust gas cleaning equipment comprising a cleaning equipment for gas scrubber fluid according to yet a further embodiment of the invention.

In FIG. 6, the cleaning equipment as described in FIG. 5 is further modified by incorporating a discharge buffer tank 29 connected to the second separator outlet 15 of the centrifugal separator 9 in the scrubber fluid loop. The bleed-off centrifugal separator 20' has a rotor 21' enclosing a separation space 22' which contains a stack of frustoconical separating discs 23' to which separation space the separator inlet 24' extends. The centrifugal separator 20' is further provided with a first separator outlet 25' for cleaned scrubber fluid, and a second outlet 26' extending from the separation space for discharge of a separated phase with density higher than the cleaned scrubber fluid. The separator is further provided with a conveyor screw 28 which is enclosed in the rotor 21' and which is arranged to be driven at a rotational speed differing from the rotational speed of the rotor so that to convey the pollutant phase towards the second separator outlet 26'. The buffer tank 29 is further connected to the inlet 24' of the bleed-off centrifugal separator 20' via fluid regulating means. The fluid regulating means may comprise a feed pump or a valve in combination with gravity-driven flow. The operation of the cleaning equipment differs from what is described in FIG. 5 in that the discharged pollutant phase from the separator 9 in the scrubber fluid loop may be introduced and further concentrated in the separator 20'. The scrubber fluid containing the pollutant phase is introduced into the separation space 22' contained in the rotor 21' rotating at a high speed and further into the disc stack 23'. Typically, the disc stack is rotating at 7500 rpm, and the radius of the separation space is 93 mm, thus exerting a centrifugal force up to 5750 G during operation. The pollutant phase has a mean density that is higher than the scrubber fluid. Under the influence of centrifugal forces and facilitated by the inclined surfaces of the separating discs, the pollutant phase is separated from the scrubber fluid and collected at a radially outer region of the separation space 22' from which it is conveyed by means of the conveyor screw 28 which is driven at a rotational speed differing from the rotational speed of the rotor. The pollutant phase is conveyed to the second separator outlet 26', from which it is discharged. The discharged pollutant phase may be collected on the ship for later disposal. The flow of polluted fluid from the buffer tanks 6 and 29 may be individually controlled to alter or blend the flows in a suitable manner. In particular the bleed-off separator 20' may be used to further concentrate material from the discharge buffer tank 29 when the need for bleeding off scrubber fluid from the scrubber fluid loop is low.

The cleaning equipment shown in any of the figures may further comprise a quality control device 30 as illustrated in FIG. 6, adapted to divert the flow of the cleaned scrubber fluid if the quality is lower than a certain required or predetermined quality level. The cleaned scrubber fluid may thus be diverted and/or returned to the scrubber fluid loop, such as to the buffer tank 6, to the separator inlet 24 or 24' or to a separate tank (not shown). The quality control device may be adapted control the turbidity, the pH and/or the concentration of particular chemical compounds such as polyaromatic hydrocarbons. Typically the quality control device control that the turbidity of the cleaned scrubber fluid is less than 25 FNU (formazin nephlometric units), or 25 NTU (nephlometric turbidity units), above the turbidity of the fluid being entered into the system, that the acidity is above pH 6.5 at the overboard discharge with the exception that during maneuvering and transit, the maximum difference to the fluid being entered into the system being pH 2.

The cleaning equipment shown in any of the figures may further comprise a device 31 for the addition of a flocculant to the polluted scrubber fluid upstream of the separator inlet 24 or 24', as illustrated in FIG. 6. Such a device 31 may be arranged upstream of any separator inlet 8, 24 or 24' in any one of FIGS. 1-6, and upstream or downstream of the optional feed pump 10 or 27. The flocculant may be a polyelectrolyte and is added in order to facilitate agglomeration of particles in the polluted scrubber fluid when needed, to improve the separation efficiency and/or separation capacity.

Although the present invention has been disclosed and described with reference to certain embodiments thereof, it should be noted that other variations and modifications may be made, and it is intended that the following claims cover the variations and modifications within the true scope of the invention.

What is claimed is:

1. An exhaust gas cleaning equipment for a diesel engine, comprising:
   a gas scrubber for cleaning exhaust gas whereby the gas scrubber produces polluted scrubber fluid comprising pollutant particles;
   a scrubber fluid cleaning equipment;
   a buffer tank in fluid communication between and with the gas scrubber and the scrubber fluid cleaning equipment;
   the scrubber fluid cleaning equipment being configured for cleaning said polluted scrubber fluid, said scrubber fluid cleaning equipment comprising a centrifugal separator for separating at least a pollutant phase comprising pollutant particles and a cleaned scrubber fluid from said polluted scrubber fluid, which centrifugal separator comprises a rotor enclosing a separation space with a stack of separating discs, means for conducting polluted scrubber fluid from said buffer tank to a separator inlet of said separation space, a first separator outlet for cleaned scrubber fluid extending from said separation space to said buffer tank, and a second separator outlet for the pollutant phase extending from said separation space, the scrubber fluid cleaning equipment further comprises, and means for conducting cleaned scrubber fluid from the buffer tank to the exhaust gas scrubber.

2. The exhaust gas cleaning equipment according to claim 1, wherein the means for conducting polluted scrubber fluid from said buffer tank to a separator inlet of said separation space are arranged for conducting polluted scrubber fluid directly from the buffer tank to the separator inlet.

3. The exhaust gas cleaning equipment according to claim 1, wherein the means for conducting cleaned scrubber fluid from the buffer tank to the exhaust gas scrubber are arranged for conducting cleaned scrubber fluid directly from the buffer tank to the exhaust gas scrubber.

4. The exhaust gas cleaning equipment according to claim 1 wherein the second separator outlet comprises discharge ports for intermittent discharge of the pollutant phase.

5. The exhaust gas cleaning equipment according to claim 4 wherein the scrubber fluid cleaning equipment further comprises means for determining a process parameter of the centrifugal separator related to the amount of pollutant phase in the radially outer parts of the separation space and means arranged to open the discharge ports of the second separator outlet under a predetermined condition on said process parameter indicating that the amount of pollutant phase in the radially outer parts of the separation space exceeds a predetermined level.

6. The exhaust gas cleaning equipment according to claim 5 wherein an operational parameter is a turbidity of cleaned scrubber fluid in the first separator outlet and the predetermined condition of said operational parameter is that the turbidity exceeds a predetermined level.

7. The exhaust gas cleaning equipment according claim 1, wherein the separator inlet is of a hermetic type.

8. The exhaust gas cleaning equipment according to claim 1 wherein the scrubber fluid cleaning equipment further comprises a bypass communicating with the separator inlet and the first separator outlet.

9. The exhaust gas cleaning equipment according to claim 1, wherein the scrubber fluid is water.

10. The exhaust gas cleaning equipment according to claim 1 further comprising means for bleeding off part of the polluted scrubber fluid to a bleed-off disc stack centrifugal separator, which is arranged for separating at least a pollutant phase comprising pollutant particles and a cleaned scrubber fluid from said polluted scrubber fluid.

11. The exhaust gas cleaning equipment according to claim 10 wherein said bleed-off disc stack centrifugal separator further is arranged to receive pollutant phase from said second separator outlet.

12. A method for cleaning polluted scrubber fluid, comprising the steps of:
provided an exhaust gas scrubber;
providing a scrubber fluid cleaning equipment, said scrubber fluid cleaning equipment comprising a centrifugal separator, said centrifugal separator comprising a rotor enclosing a separation space with a stack of separating discs therein;
providing a buffer tank in fluid communication between and with the gas scrubber and the scrubber fluid cleaning equipment;
providing means for conducting polluted scrubber fluid from said buffer tank to a separator inlet of said separation space, a first separator outlet for cleaned scrubber fluid extending from said separation space to said buffer tank, and a second separator outlet for a pollutant phase extending from said separation space and means for conducting a cleaned scrubber fluid from said buffer tank to the exhaust gas scrubber;
providing said polluted scrubber fluid from the exhaust gas scrubber, said polluted scrubber fluid comprising pollutant particles;
separating, in the centrifugal separator, the pollutant phase comprising said pollutant particles from the polluted scrubber fluid, thereby providing the cleaned scrubber fluid; and
providing the cleaned scrubber fluid to the exhaust gas scrubber.

13. The method according to claim 12, further comprising the step of:
providing cleaned scrubber fluid from the centrifugal separator to a buffer tank, and providing cleaned scrubber fluid from the buffer tank to the exhaust gas scrubber.

14. The method according to claim 12, wherein cleaned scrubber fluid is provided directly from the centrifugal separator to the exhaust gas scrubber.

15. The method according to any one of the claim 12, further comprising the step of:
discharging the separated pollutant phase comprising pollutant particles from the centrifugal separator.

\* \* \* \* \*